US006631237B2

(12) United States Patent
Knudsen et al.

(10) Patent No.: US 6,631,237 B2
(45) Date of Patent: Oct. 7, 2003

(54) TERMINATION AND SPLICE PANEL

(75) Inventors: Clinton M. Knudsen, St. Louis Park, MN (US); John W. Henderson, Andover, MN (US); John C. Holman, Coon Rapids, MN (US); Joy K. McKnight, Carver, MN (US); Trevor D. Smith, St. Louis Park, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 142 days.

(21) Appl. No.: 09/800,430

(22) Filed: Mar. 6, 2001

(65) Prior Publication Data

US 2002/0125800 A1 Sep. 12, 2002

(51) Int. Cl.[7] .................................................. G02B 6/00
(52) U.S. Cl. ........................ 385/134; 385/135; 174/50
(58) Field of Search ................................ 385/134, 135; 174/50

(56) References Cited

U.S. PATENT DOCUMENTS

| 4,824,196 A | | 4/1989 | Bylander ................... 385/134 |
|---|---|---|---|
| 5,093,885 A | * | 3/1992 | Anton ....................... 385/134 |
| 5,402,515 A | * | 3/1995 | Vidacovich et al. ........ 385/135 |
| RE34,955 E | | 5/1995 | Anton et al. ................ 385/53 |
| 5,734,776 A | * | 3/1998 | Puetz ........................ 385/134 |
| 6,097,872 A | * | 8/2000 | Kusuda et al. ............. 385/134 |
| 6,215,938 B1 | | 4/2001 | Reitmeyer et al. ......... 385/135 |

FOREIGN PATENT DOCUMENTS

| WO | WO 99/27404 | 6/1999 |
|---|---|---|
| WO | WO 00/52504 | 9/2000 |
| WO | WO 00/75706 A2 | 12/2000 |

OTHER PUBLICATIONS

ADC Telecommunications FL2000 Products Catalog, dated Dec. 2000.

* cited by examiner

*Primary Examiner*—Michael C. Zarroli
(74) *Attorney, Agent, or Firm*—Merchant & Gould P.C.

(57) ABSTRACT

A telecommunications termination cabinet includes first and second connector bulkheads, the first bulkhead located in forward position relative to the second bulkhead. The first bulkhead is pivotally mounted to the cabinet. A splice cabinet is positioned below the termination cabinet.

13 Claims, 13 Drawing Sheets

TERMINATION AND SPLICE PANEL

FIELD OF THE INVENTION

The present invention relates to termination, connection and splicing systems for telecommunications cables.

BACKGROUND OF THE INVENTION

Termination, connection and splicing systems are known in the field of telecommunications. In the recent past, there has been an explosive growth of demand for additional telecommunications paths and bandwidth. While the demand for such resources has grown, the space available to install the systems providing these resources has not. Thus, greater capabilities are being demanded which must be provided within the same physical space. This growth in demand has in some cases meant that previously adequate telecommunications installations have become overloaded. To use the same physical space for the installation of new telecommunication systems, higher density termination, connection, and splicing equipment has become apparent.

In addition, in developing regions of the world, many of the facilities were not designed with dedicated space such as is required by modern telecommunications equipment. To serve these new and emerging markets, a product which provides high density and which combines as many of the required functions into a single piece of equipment is highly desirable.

Existing technology available or known provides termination and connection in a single panel but not at a sufficiently high density to address the growing need for telecommunications growth. Also, current technology splicing products are offered in a separate cabinet or panel from the termination and connection products.

Further development in telecommunications termination, connection and splicing systems is desired.

SUMMARY OF THE INVENTION

One aspect of the present invention relates to a termination and cross-connect system including two cable connector bulkheads within a single cabinet. Cable management spools and guides within the cabinet support the cables within the cabinet. A rear cable opening for receiving cables, and openings and guides for the cross-connect cables exiting the cabinet are also provided. A first bulkhead for the termination and cross-connection of telecommunications cables is pivotally mounted at the front of the cabinet and swings open to provide access to a second bulkhead. Cable management devices are mounted to the first bulkhead for cables on both sides of the first bulkhead and these devices move with the first bulkhead as it moves between open and closed positions. The second bulkhead also has cable management devices for directing cables to and from the bulkhead.

A further aspect of the invention relates to splicing and high-density termination and cross-connect functions within the same system. The termination and cross-connect function are handled in a first cabinet with two bulkheads as described above. A second cabinet in the same system provides a rear cable access and cable management devices for managing the incoming and outgoing cables within the cabinet. The second cabinet has a plurality of cable splice tray storage locations for storing splice trays used to splice telecommunications cables. The first and second cabinets preferably have the same footprint and can be mounted with the first cabinet vertically above the second cabinet.

A variety of advantages of the invention will be set forth in part in the detailed description that follows and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specifications, illustrate several aspects of the invention and together with the description, serve to explain the principles of the invention. A brief description of the drawings is as follows.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
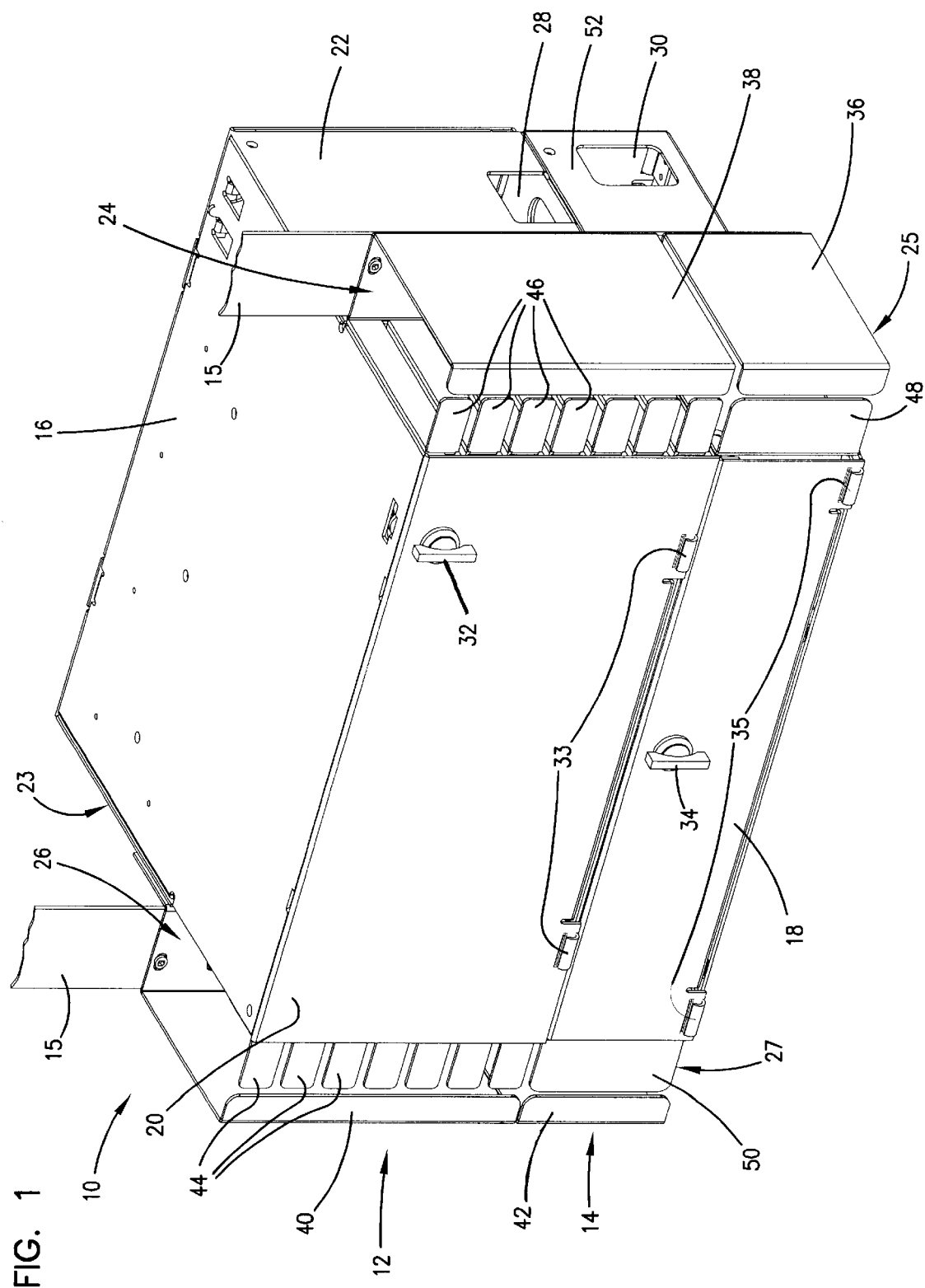
FIG. 1 is a front perspective view of a first embodiment of a telecommunications cable connection assembly.

Referring now to FIG. 1, a telecommunications assembly 10 is shown, consisting of a termination cabinet 12 and a splicing cabinet 14. Cabinets 12, 14 can be mounted to a rack, frame or other support 15 through holes 17 and suitable fasteners. Termination cabinet 12 includes a top 16, two sides 22 and 23, and a front cover 20. Front cover 20 is hinged to cabinet 12 with hinges 33 and releasably held closed by a latch 32. Preferably, front cover 20 is removable from the rest of cabinet 12. On the sides of cabinet 12 are vertical cable channels 24 and 26 defined by side covers 38 and 40, movable finger guides 44 and fixed finger guides 46. Toward the rear of cabinet 12 in side 22 is rear cable opening 28.

Splicing cabinet 14 includes sides 52 and 53, and front cover 18. Front cover 18 is hinged to splicing cabinet 14 with hinges 35 and releasably held closed by latch 34. Preferably, front cover 18 is removable from the rest of splicing cabinet 14. Vertical cable guides 25 and 27, which align with vertical cable guides 24 and 26 when cabinets 12 and 14 are assembled to form assembly 10, are defined by side covers 36 and 42 and by fixed front plates 48 and 50. Toward the rear of sides 52 and 53 are rear cable openings 30 and 31.

Figure 2:
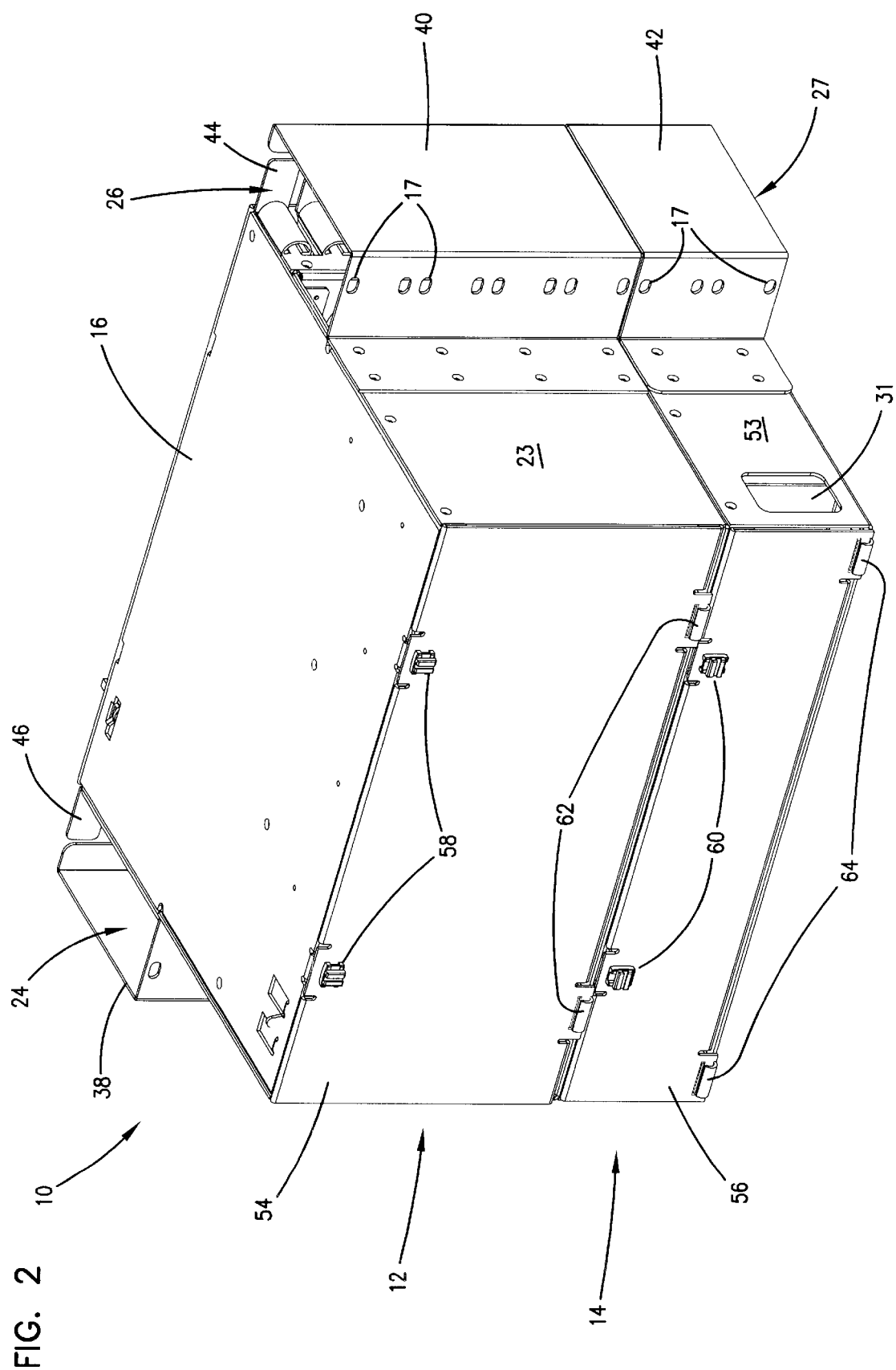
FIG. 2 is a rear perspective view of the telecommunications cable connection assembly in FIG. 1.

Referring now to FIG. 2, the rear of assembly 10 is shown. Cabinet 12 includes a rear door 54 hinged to cabinet 12 by hinges 62 and releasably held closed by latches 58. Splicing cabinet 14 includes a rear door 56 hinged to splicing cabinet 14 by hinges 64 and held releasably closed by hinges 60. Preferably, rear doors 54, 56 are removable from the rest of cabinets 12 and 14.

Figure 3:
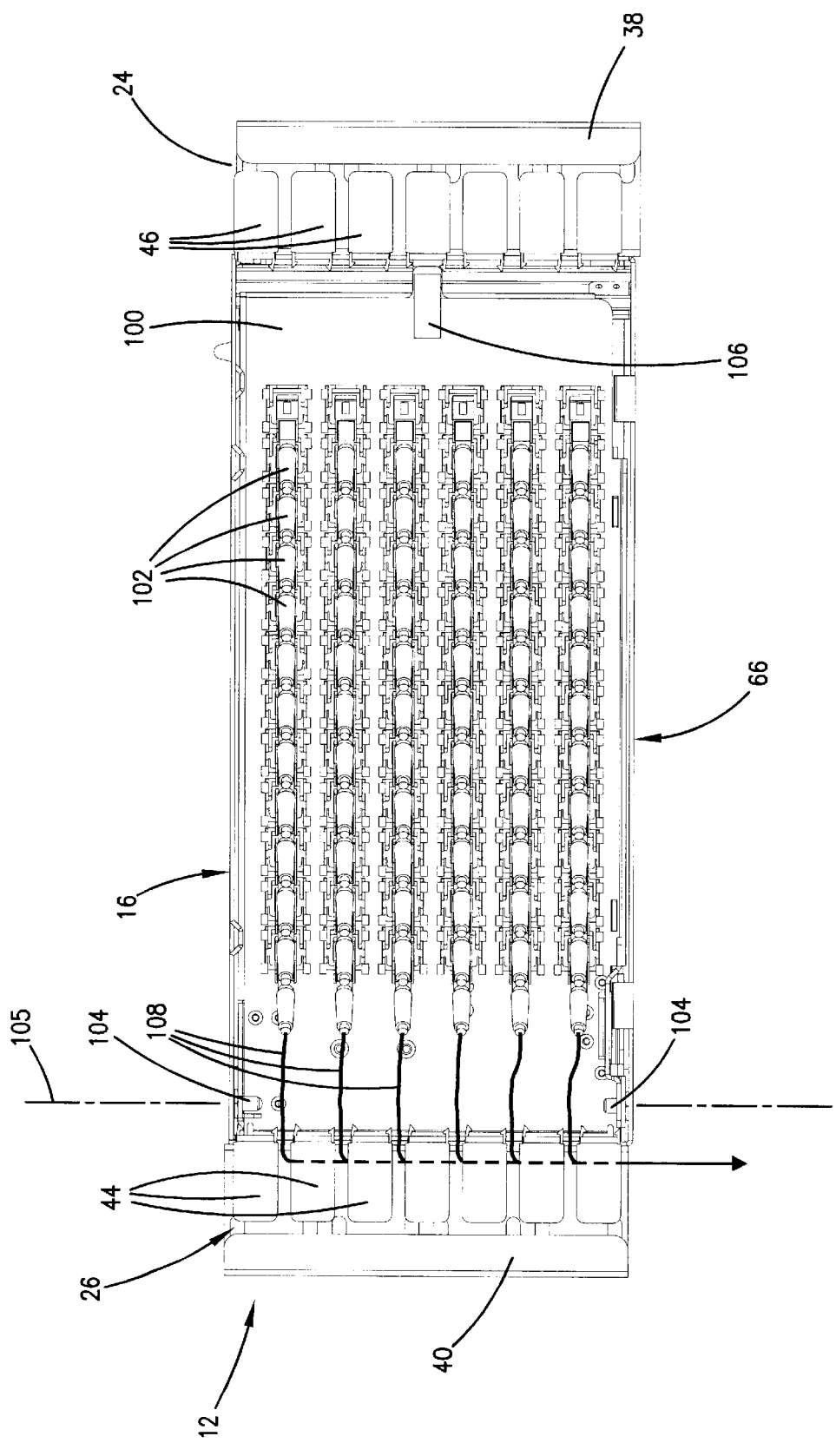
FIG. 3 is a front view of the termination cabinet of FIG. 1 with the front door removed showing the front connectors connected to the first bulkhead and some representative cables.

FIGS. 3 through 9 illustrate termination and cross-connection of cables through cabinet 12 of telecommunications assembly 10. Referring now to FIG. 3, the front of first bulkhead 100 inside cabinet 12 is shown. Also, bottom 66 of cabinet 12 can now be seen. Bulkhead 100 includes a plurality of connector assemblies 102 extending through the bulkhead for connecting telecommunications cables. Connector assemblies 102 are angled with respect to bulkhead 100 so that the cables connected to the front of connector assemblies 102 are angled toward vertical cable guide 26. Representative cables 108 are shown in FIG. 3 connecting to the left-most column of connector assemblies 102, passing through movable finger guides 44 and transitioning into vertical channel 26. Bulkhead hinge 104 defines a vertical axis 105 about which bulkhead 100 rotates as it moves between open and closed positions. When bulkhead 100 is in the closed position, latch 106 releasably holds the bulkhead.

Figure 4:
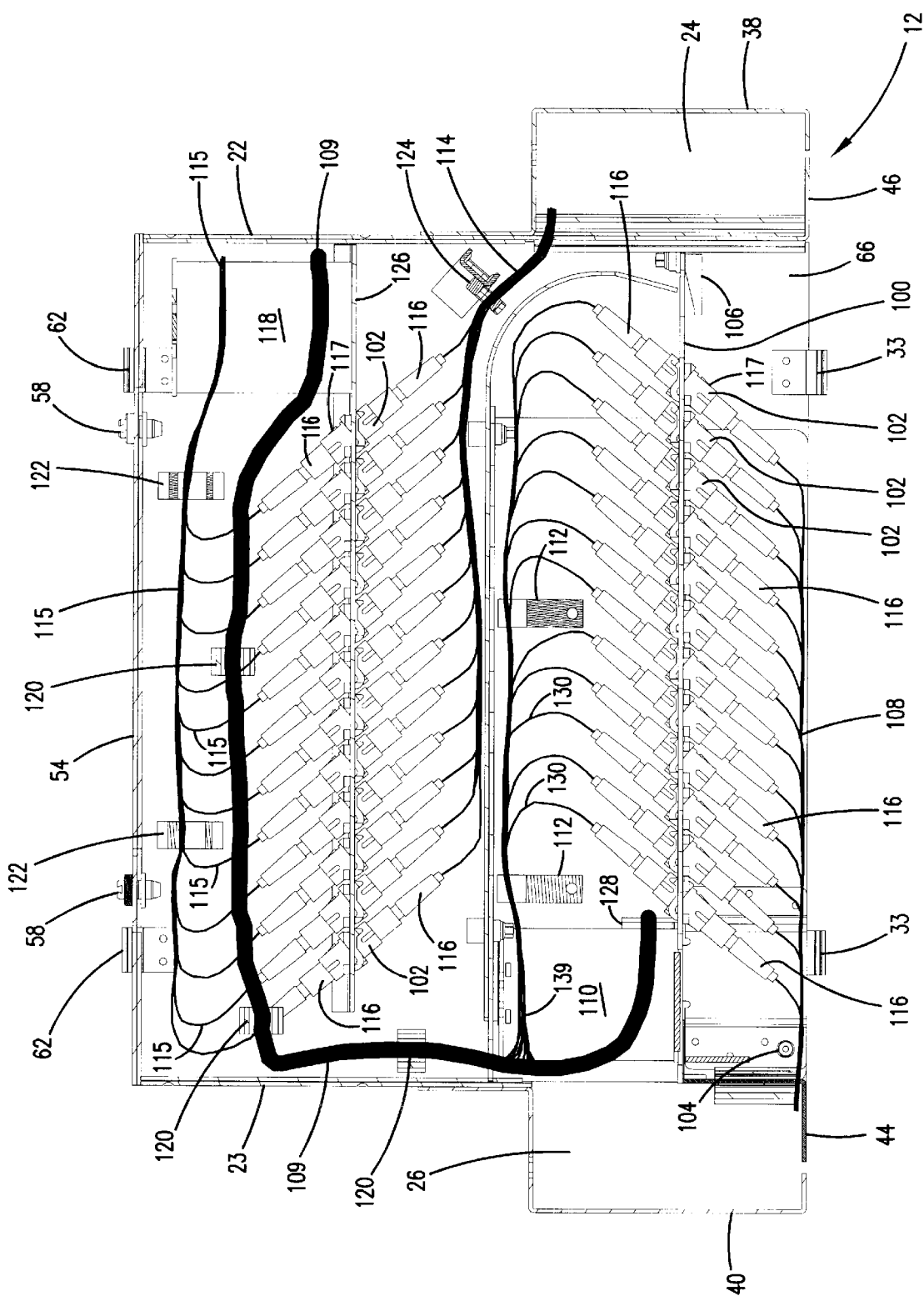
FIG. 4 is a cross-sectional top view of the cabinet in FIG. 3 taken at line A—A with representative cables connected to both the first and second bulkheads.
Figure 5:
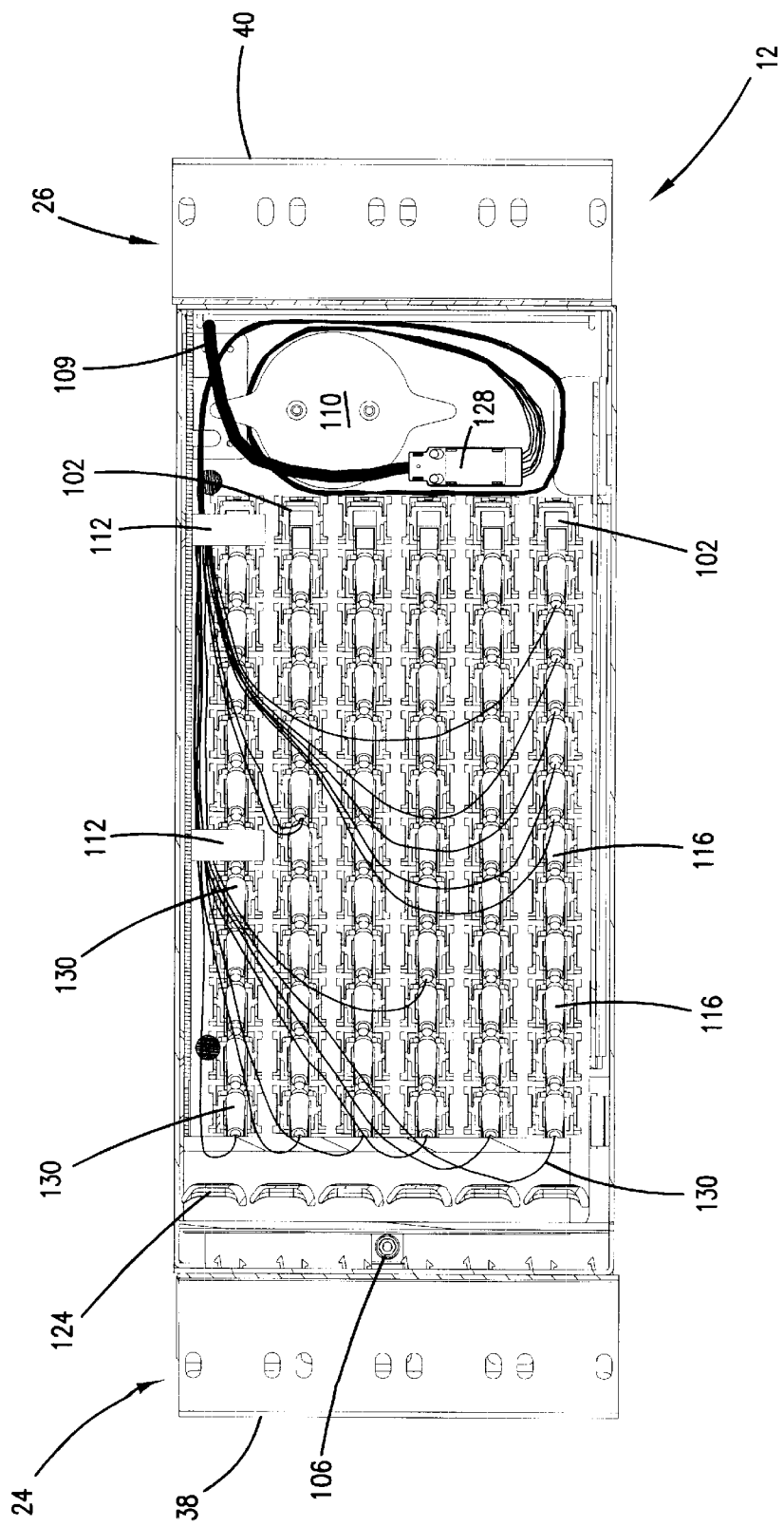
FIG. 5 is a cross-sectional view of the cabinet in FIG. 4 taken at line B—B showing the rear connectors connected to the first bulkhead and some representative cables.

Referring now to FIGS. 4 and 5, further details of the interior of cabinet 12 are shown. Second bulkhead 126 is mounted behind first bulkhead 100 in cabinet 12. Extending through both bulkheads 100 and 126 are connector assemblies 102. Connector assemblies 102 in bulkhead 100 are angled horizontally to direct front cables 108 to the left side of cabinet 12 to facilitate cables 108 exit from cabinet 12 via moving finger guides 44 and vertical cable guide 26. Connector assemblies 102 in bulkhead 126 are angled horizontally to direct front cables 114 to the right side of cabinet 12 through cable guides 124 and out of cabinet 12 via fixed finger guides 46 and vertical cable guide 24. Rear cables 109, 115 lead to the rear sides of bulkheads 100, 126, respectively. At the end of each cable 108, 109, 114 and 115 is a connector 116 sized and shaped for insertion into an adapter 117 for making optical connections between cables 108 and 109, and cables 114 and 115. Adapters 117 mount to openings in bulkheads 100, 126, such as from sheet metal, with angled retainers, such as shown in U.S. Pat. No. 5,214,735. Other angled mounting arrangements can be used to angle the front connectors left and right.

Shown in these FIGS. are optical fiber cables, adapters and connectors. It is anticipated that copper telecommunications cables and connectors will also be used in cabinet 12.

Cables enter the rear of cabinet 12 through rear cable openings 28 and/or 29 and are ultimately connected to connector assemblies 102 in bulkheads 100 and 126, respectively. Cables 108 and 114 are cross-connect cables (patch cords) inserted in the front of connector assemblies 102 and exit from cabinet 12 as indicated above. Rear cable spool 118 serves to protect cables 109 and cables 115 from violating bend radius rules and direct the cable into cable guides 120 and 122. Cables 115 then pass through cable guides 122 and are fanned out as appropriate to be directed to the rear of connector assemblies 102 in bulkhead 126 and thus be optically connected with cables 114. Cables 109 then pass through cable guides 120 which direct cables 109 so as not interfere with the passage of cables 115 to connector assemblies 102. Cable guides 120 direct cables 109 to front cable spool 110, mounted to the rear of bulkhead 100. Front cable spool 110 serves to protect cables 109 from violating bend radius rules as cables 109 transition from the rear to the front of cabinet 12. Under front cable spool 110 is cable fanning unit 128 for use with bundled style cables 109 and separates the individual cables 130 (such as individual fibers) within the bundled cables 109 so that each fiber can be connected to with an adapter 117 at the rear of connector assemblies 102 mounted to bulkhead 100. Fibers 130 pass from fanning unit 128 over front cable spool 110, through cable guides 112 and are inserted in the rear of connector assemblies 102 to be optically connected to cables 108 at the front of connector assemblies 102.

Figure 6:
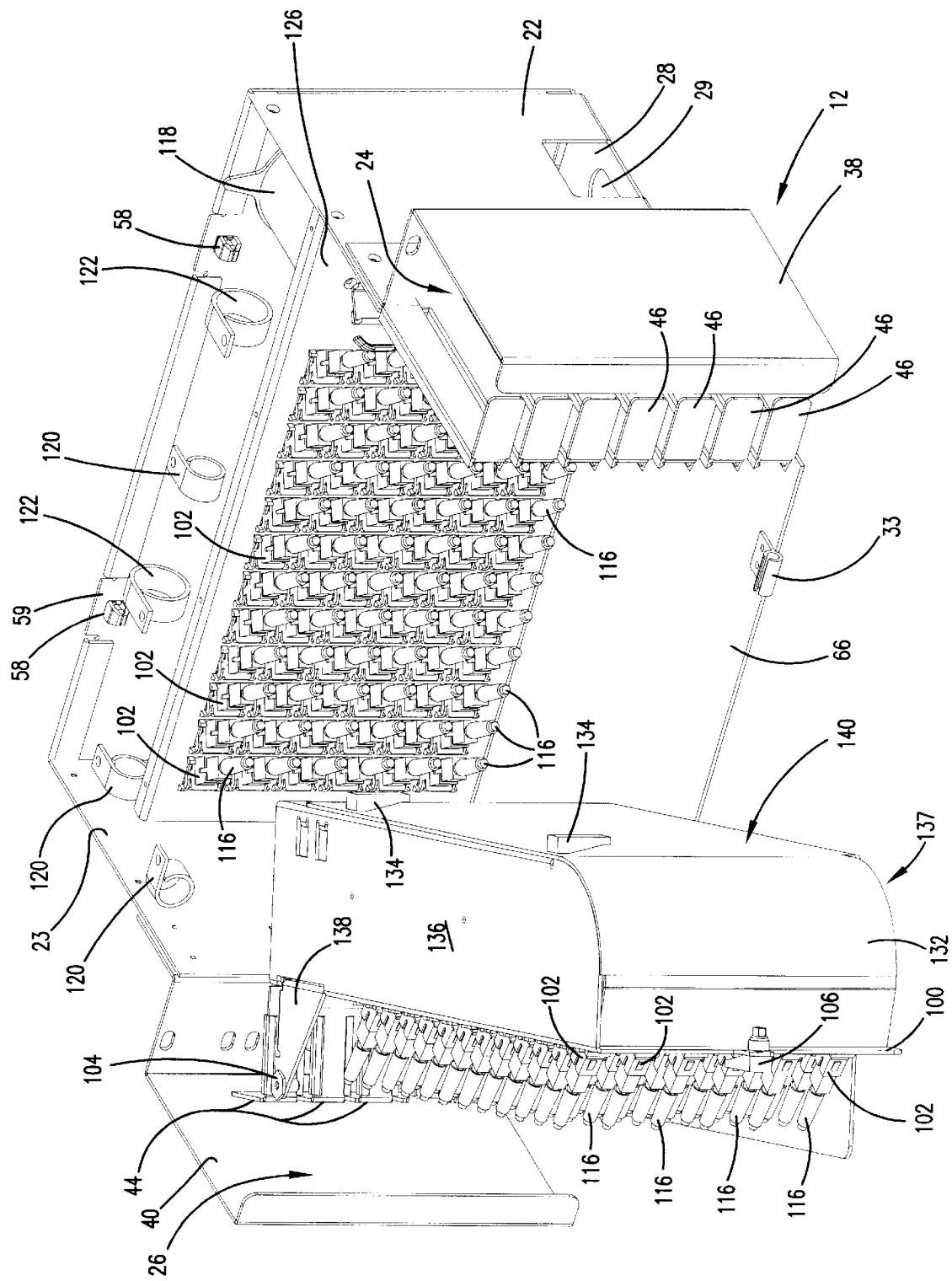
FIG. 6 is a front perspective view of the cabinet shown in FIG. 4 with the top removed and the first bulkhead pivoted to an open position.
Figure 7:
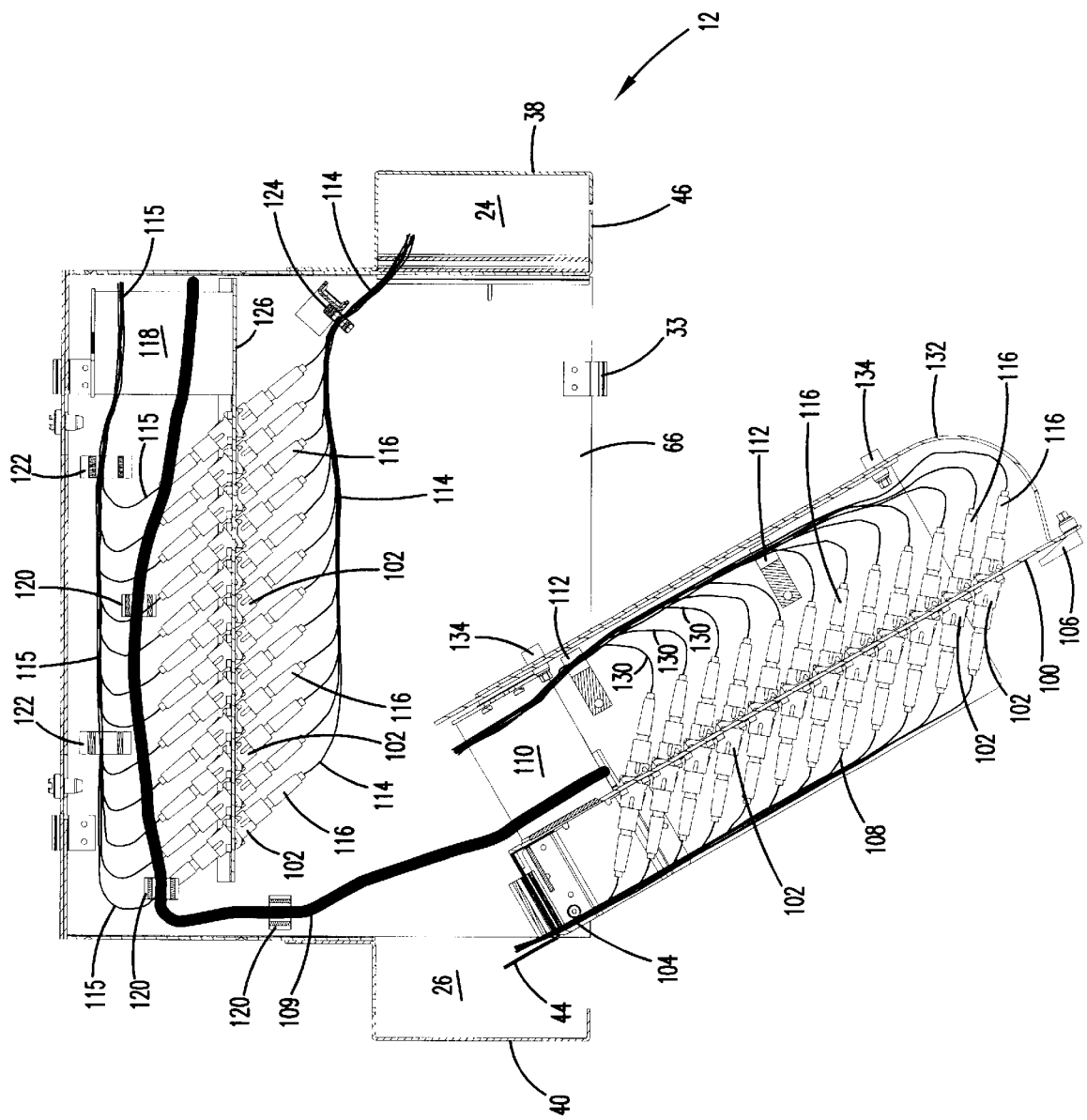
FIG. 7 is a cross-sectional top view of the cabinet in FIG. 6 with representative cables connected to both bulkheads.

Referring now to FIGS. 6 and 7, more details of the interior of cabinet 12 and the rear of bulkhead 100 are shown. Rear bottom opening 29 in bottom 66 is shown in rear corner of cabinet 12. Hinge 104 for bulkhead 100 is mounted to bulkhead 100 via a flange 138. Flange 138 is sized and shaped so that when bulkhead 100 is in the closed position, bulkhead 100 is recessed with respect to front cover 20 so that front cover 20 can be closed without interfering with cables 108 and front connectors 116. To the rear of bulkhead 100 are mounted top and bottom housings 136 and 137. Rear housing 132 is releasably mounted to the rear of housings 136 and 137 with latches 134. Together, housings 132, 136 and 137 comprise a rear protective cover 140 for cables 109, fibers 130, rear connectors 116 and front cable spool 110. Cable guides 112 are mounted within protective cover 140. The end of protective cover 140 proximate to front cable drum 110 is open to allow the passage of cables 109 into the area protected by cover 140.

Figure 8:
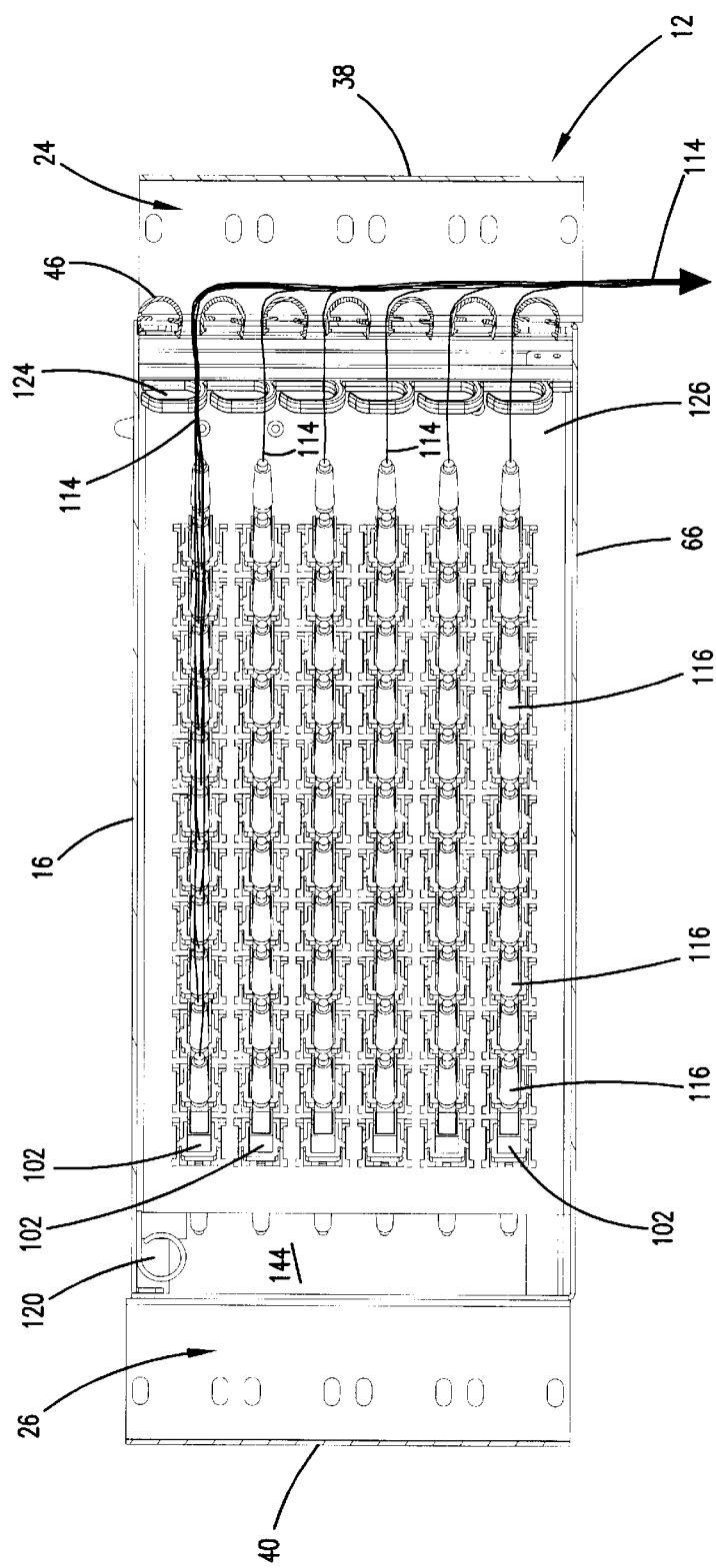
FIG. 8 is a cross-sectional view of the cabinet in FIG. 7 taken at line C—C showing the front connectors connected to the second bulkhead and some representative cables.

FIG. 8 shows additional detail of second bulkhead 126 and the rear of cabinet 12. Cables 114 are connected to adapters 117 with connectors 116 and are directed to the right side of cabinet 12. There, cables 114 are organized by cable guide 124 before passing through fixed cable fingers 46 and into vertical cable channel 24. Bulkhead 126 is shown mounted between top 16 and bottom 66 with gap 144 to the left side to allow cables 109 to pass through cable guides 120 into protective cover 140 for connection in bulkhead 100. Other mounting arrangements for bulkhead 126 are anticipated provided that passage of cables 109 from rear cable opening 28 to protective enclosure 140.

Figure 9:
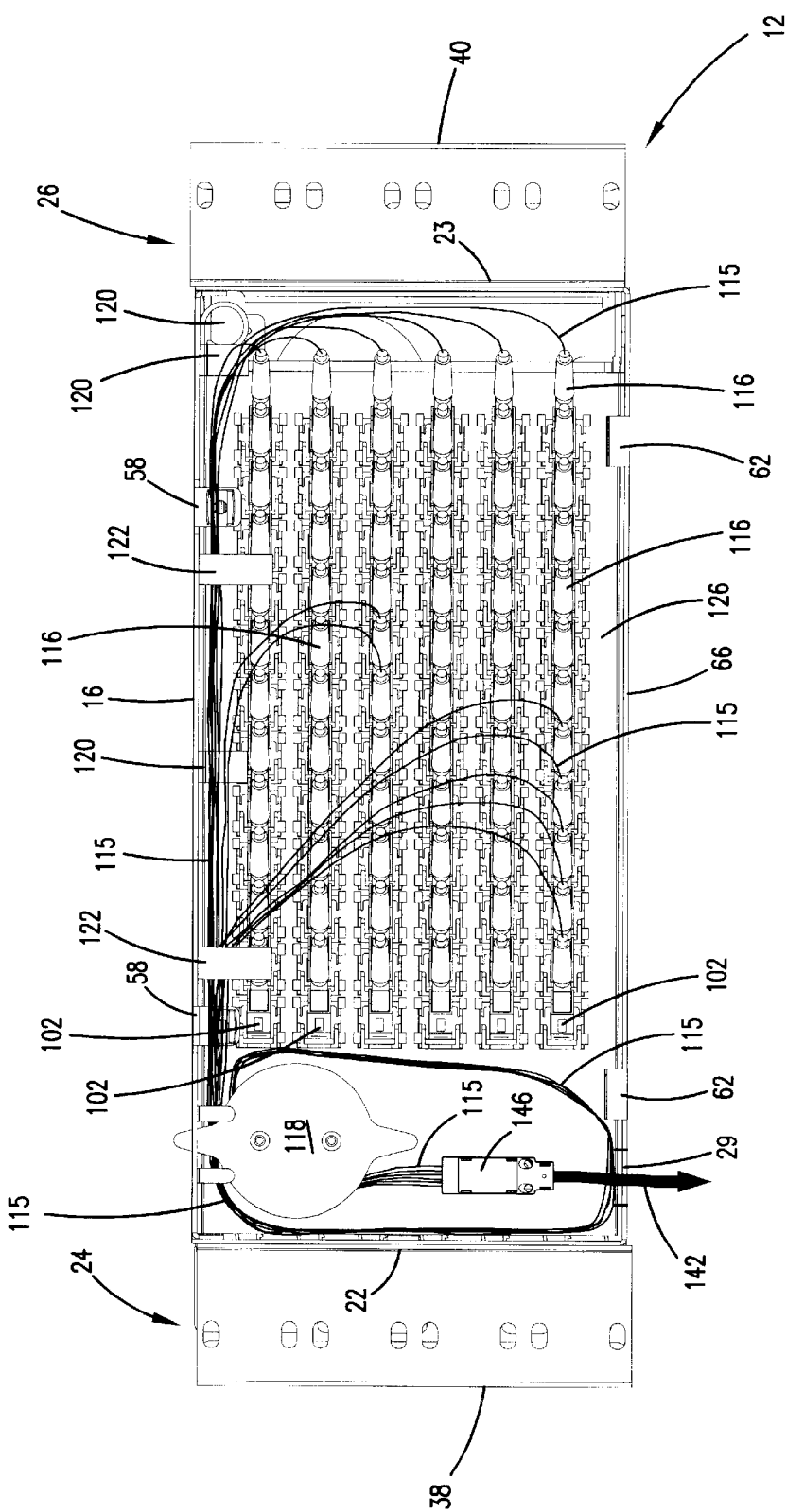
FIG. 9 is a rear view of the cabinet in FIG. 4 with the rear door removed showing the rear connectors connected to the second bulkhead and some representative cables.

FIG. 9 provides additional detail of the arrangement of the rear of bulkhead 126. Cable fanning unit 146 is positioned beneath rear cable spool 118 and receives bundled cables 142 and separates the individual cables 115 (single fibers) within the bundled cables 142 so that each cable 115 can be connected to the rear of connector assemblies 102 mounted through bulkhead 126. In FIG. 9, bundled cables 142 are shown entering cabinet 12 via bottom opening 29 in bottom 66. Alternatively, bundled cables 142 could enter cabinet 12 via rear cable opening 28 in side 22, shown in FIG. 6.

Figure 10:
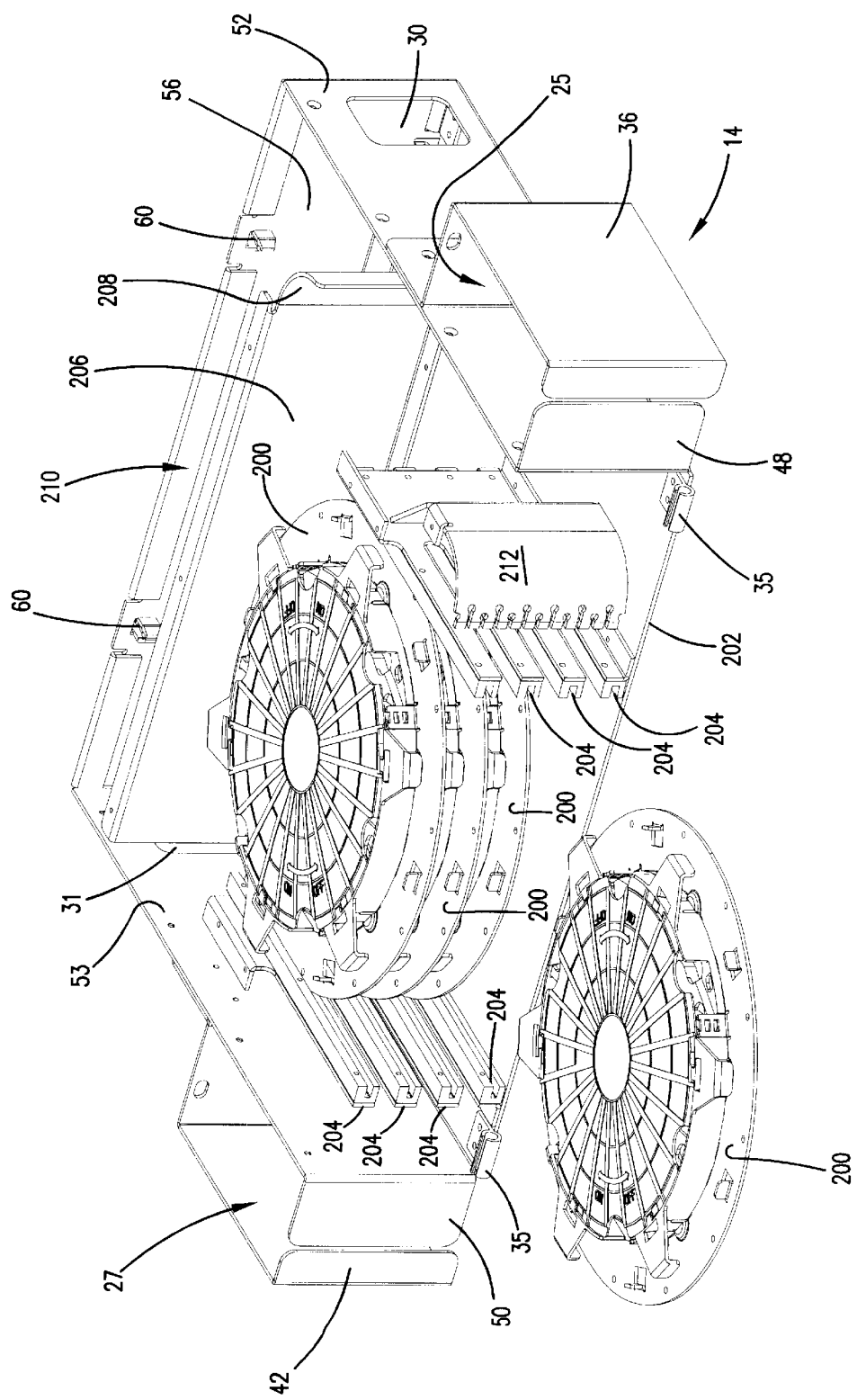
FIG. 10 is a front perspective view of the splicing cabinet of FIG. 1 with the top and front door removed, and one of the splicing trays shown removed from the splicing cabinet.

FIGS. 10 through 13 illustrate splicing cabinet 14 of telecommunications assembly 10. Referring now to FIG. 10, internal details of cabinet 14 are shown. Four splice trays 200 are slidably and removably mounted in slots 204. Splice trays 200 shown are round splice trays for splicing fiber optic cables, and are described in more detail in PCT WO 00/17693. Splice trays 200 include splice holders and cable storage structure for storing the excess cable. Other shapes and designs of splice trays are anticipated for use with cabinet 14 and assembly 10. Behind splice trays 200 and slots 204 is rear cable wall 206, which cooperates with rear cover 56 to form rear cable channel 210. At the right end of rear cable wall 206 is radius limiter 208 to prevent cables passing between the splice trays and the rear cable channel from violating bend radius requirements. Cables may enter and exit the rear cable channel from outside cabinet 14 through rear cable openings 30 and 31 in walls 52 and 53, respectively, or through a top cable opening 214 in the removed cabinet top 216. Cables going to and from splice trays 200 also pass around radius limiter 212 near the front of cabinet 14 and mounted proximate to slots 204.

Figure 11:
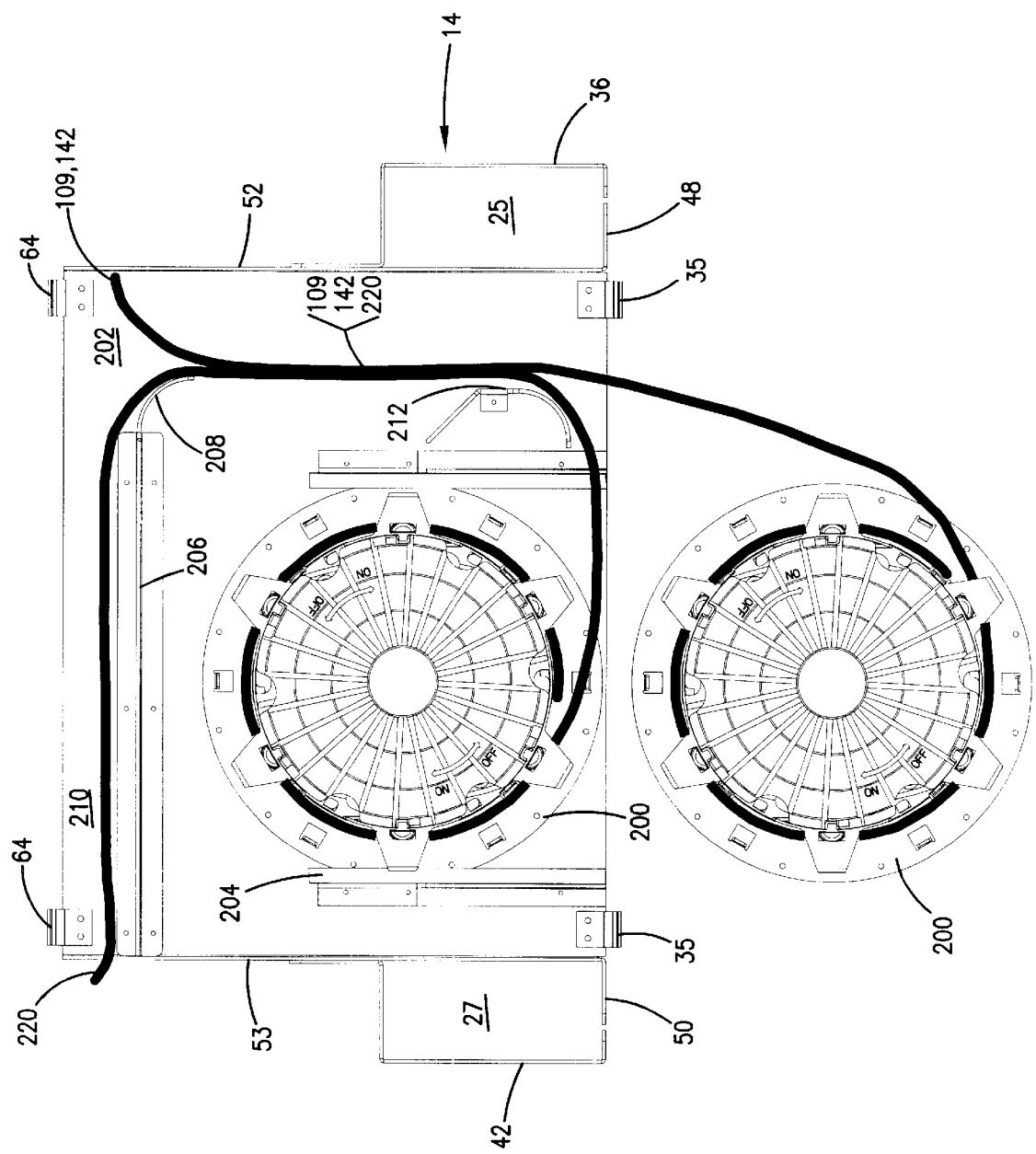
FIG. 11 is a top view of the splicing cabinet shown in FIG. 10 with representative cables entering and exiting the cabinet from the rear and being led to the splicing trays.
Figure 12:
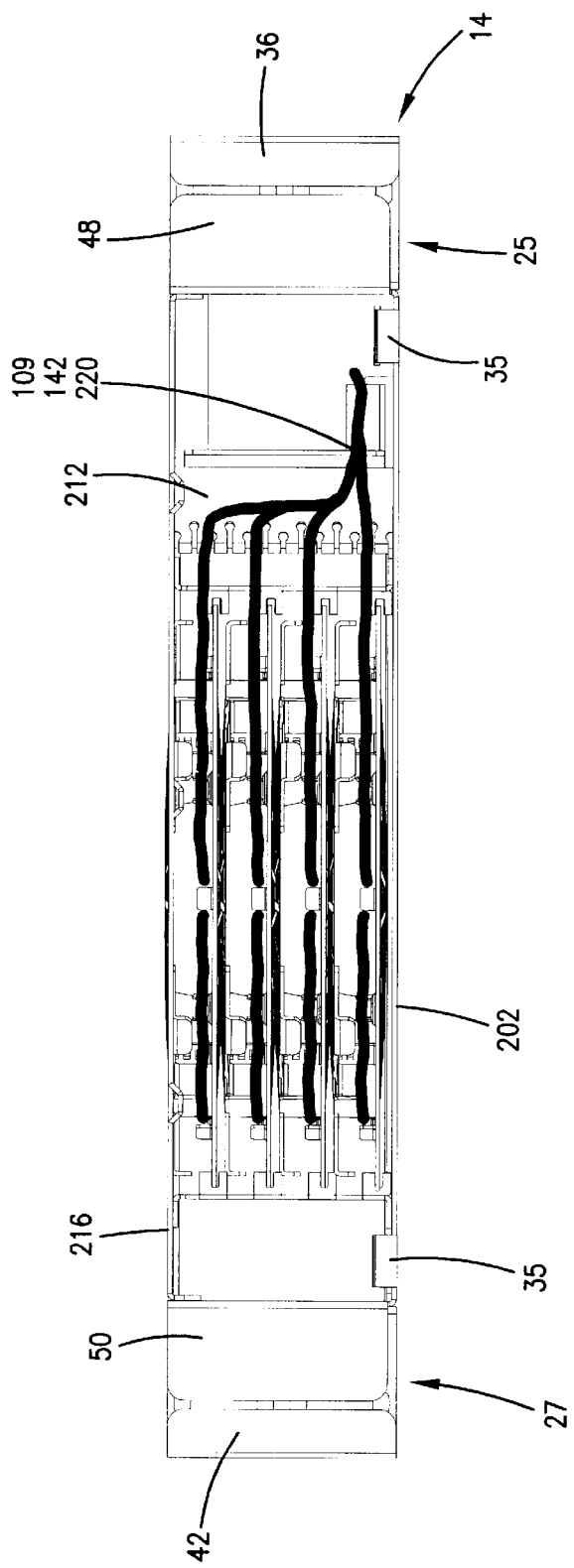
FIG. 12 is a front view of the splicing cabinet shown in FIG. 10 with representative cables leading to and from the splicing trays.

Referring now to FIGS. 11 and 12, the routing of cables within cabinet 14 is shown. Outside plant cables 220 are shown entering rear cable channel 210 through rear cable opening 31. Cables 220 pass through channel 210, around radius limiter 208 and enters a splice tray 200. In splice tray 200, a cable 220 is spliced into either a cable 109 or a cable 142. This cable 109 or cable 142 then passes out of splice tray 200 around radius limiter 212 and exits from cabinet 14 through rear cable opening 30 and into cabinet 12 through rear cable opening 28. Alternatively, cable 109 or 142 could exit cabinet 14 through top cable opening 214 and enter cabinet 12 through rear bottom opening 29.

Figure 13:
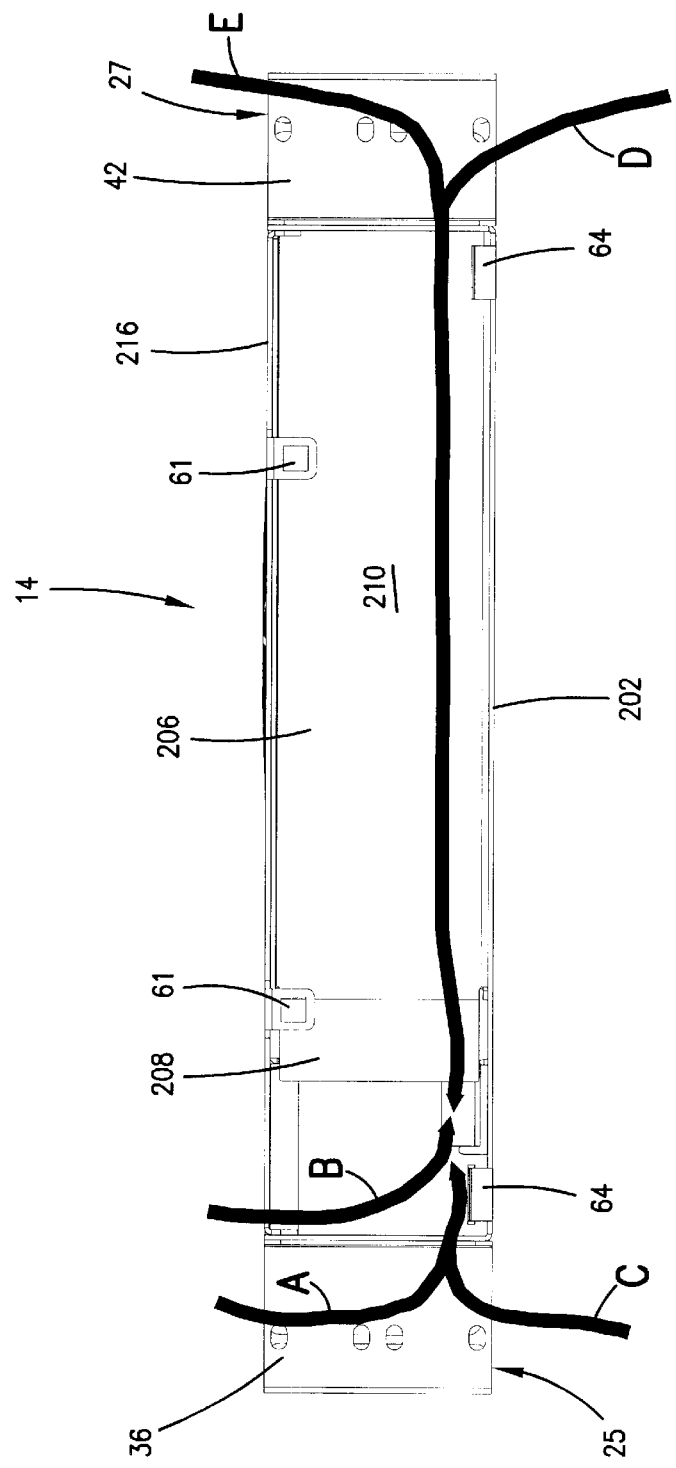
FIG. 13 is a rear view of the splicing cabinet shown in FIG, 10 with the rear door removed and representative cables leading to and from the splicing trays.

Referring now to FIG. 13, several alternative routes, labeled A through E, for cables 109 and 142 and outside plant cable 220 are shown. Alternative A shows cables 109 and 142 exiting from cabinet 14 via rear cable opening 30. Alternative B shows cables 109 and 142 exiting cabinet 14 through rear top opening 214. Alternative A, C, D, and E show different routes that outside plant cable 220 could take for entering rear cable channel 210 through rear cable openings 30 and/or 31.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is:

1. A cabinet for connecting telecommunications cables comprising:
   a housing having a top, a bottom, opposing left and right sides, a rear opening and a front opening;
   a first bulkhead having first and second faces pivotally mounted to the housing adjacent to the front opening between an open position and a closed position;
   the second face of the first bulkhead facing a rear of the housing when the first bulkhead is in the closed position;
   a second bulkhead having first and second faces mounted to the housing with the first face facing the second face of the first bulkhead when the first bulkhead is in the closed position, and with the second face of the second bulkhead facing the rear of the housing;
   the first and second bulkheads including a plurality of connection locations adapted for connecting a first cable to a second cable;
   the second face of the first bulkhead having a first cable spool for receiving a first set of cables extending from the connection locations on the second face of the first bulkhead;
   a first cable guide for directing the first set of cables from the second face of the first bulkhead past the second bulkhead and toward a rear cable exit defined by the housing;
   the second face of the second bulkhead having a second cable spool for receiving a second set of cables extending from the connection locations on the second face of the second bulkhead toward the rear cable exit;
   first and second cross-connect cable access locations defined by the housing, one cross-connection access location positioned on each side of the housing;
   a vertical cable guide adjacent each cross-connect access location to receive third and fourth sets of cables extending from the first face of each of the first and second bulkheads, respectively.

2. The cabinet of claim 1, wherein the connection locations of the first and second bulkheads are adapted to connect optical fiber cables.

3. The cabinet of claim 1, wherein the first bulkhead is pivotable about a vertical axis extending from the top to the bottom of the cabinet, the vertical axis proximate to one of the opposing left and right sides.

4. The cabinet of claim 3, wherein the vertical cable guide mounted adjacent the cross-connect cable access location includes a set of fingers mounted to the first bulkhead and pivotally movable with the first bulkhead when the first bulkhead is moved between the open and closed positions.

5. The cabinet of claim 1, wherein the housing is a first housing and further comprising a second housing including:
   a top, a bottom, opposing left and right sides, a rear wall and a front opening;
   an interior defined by the top, bottom, sides, and rear wall;
   a rear cable opening for receiving cables extending into the interior;
   a plurality of splice tray holders;
   a plurality of splice trays removably mounted to the tray holders.

6. The cabinet of claim 5, wherein the first housing is mounted above the second housing.

7. The cabinet of claim 1, wherein the second bulkhead defines a cable passage between the second bulkhead and one of the left and right sides of the housing, wherein the first cable spool is positioned adjacent to the same side, wherein the second cable spool is positioned adjacent to the other side, and wherein the rear cable exit is positioned adjacent to the other side.

8. The cabinet of claim 7, wherein the connection locations each define a connection axis, wherein the connection axes of the connection locations of the first bulkhead are angled in a first direction, and wherein the connection axes of the second bulkhead are angled in a second direction at an angle to the first direction.

9. The cabinet of claim 1, wherein the connection locations each define a connection axis, wherein the connection axes of the connection locations of the first bulkhead are angled in a first direction, and wherein the connection axes of the second bulkhead are angled in a second direction at an angle to the first direction.

10. A cabinet for connecting telecommunications cables comprising:
    a housing having a top, a bottom, opposing left and right sides, a rear opening and a front opening;

a first bulkhead having first and second faces pivotally mounted to the housing adjacent to the front opening between an open position and a closed position;

the second face of the first bulkhead facing a rear of the housing when the first bulkhead is in the closed position;

a second bulkhead having first and second faces mounted to the housing with the first face facing the second face of the first bulkhead when the first bulkhead is in the closed position, and with the second face of the second bulkhead facing the rear of the housing;

the first and second bulkheads including a plurality of connection locations adapted for connecting a first cable to a second cable;

first and second cross-connect cable access locations defined by the housing, one cross-connection access location positioned on each side of the housing;

wherein the connection locations each define a connection axis, wherein the connection axes of the connection locations of the first bulkhead are angled in a first direction, and wherein the connection axes of the second bulkhead are angled in a second direction at an angle to the first direction.

11. The cabinet of claim 10, wherein the connection locations of the first and second bulkheads are adapted to connect optical fiber cables.

12. The cabinet of claim 10, wherein the first bulkhead is pivotable about a vertical axis extending from the top to the bottom of the cabinet, the vertical axis proximate to one of the opposing left and right sides.

13. The cabinet of claim 10, wherein the second bulkhead defines a cable passage between the second bulkhead and one of the left and right sides of the housing, wherein the first cable spool is positioned adjacent to the same side, wherein the second cable spool is positioned adjacent to the other side, and wherein the rear cable exit is positioned adjacent to the other side.

* * * * *